United States Patent [19]

McCleer et al.

[11] Patent Number: 5,206,573

[45] Date of Patent: Apr. 27, 1993

[54] STARTING CONTROL CIRCUIT

[76] Inventors: Arthur P. McCleer, 900 Williamsville Lake, Gregory, Mich. 48137; Patrick J. McCleer, 1116 S. Bowen, Jackson, Mich. 49203

[21] Appl. No.: 804,831

[22] Filed: Dec. 6, 1991

[51] Int. Cl.⁵ ............................................. H02P 1/42
[52] U.S. Cl. ..................................... 318/787; 318/778
[58] Field of Search ............... 318/778, 781, 782, 785, 318/786, 787

[56] References Cited

U.S. PATENT DOCUMENTS

| | | | |
|---|---|---|---|
| 3,728,601 | 4/1973 | Fricker et al. | 318/787 |
| 3,740,631 | 6/1973 | Fricker et al. | 318/787 |
| 3,777,232 | 12/1973 | Woods et al. | 318/221 |
| 4,145,646 | 3/1979 | Werderitch | 318/782 |
| 4,307,327 | 12/1981 | Streater et al. | 318/786 |
| 4,382,217 | 5/1983 | Horner et al. | 318/786 |
| 4,409,532 | 10/1983 | Hollenbeck et al. | 318/786 |
| 4,486,700 | 12/1984 | Kawate et al. | 318/787 |
| 4,496,895 | 1/1985 | Kawate et al. | 318/781 |
| 4,651,077 | 3/1987 | Woyski | 318/787 |
| 4,751,450 | 6/1988 | Lorenz et al. | 318/786 |
| 4,782,278 | 11/1988 | Bossi et al. | 318/786 |
| 4,804,901 | 2/1989 | Pertessis et al. | 318/786 |
| 4,862,053 | 8/1989 | Jordan | 318/786 |
| 5,017,853 | 5/1991 | Chmiel | 318/786 |

*Primary Examiner*—William M. Shoop, Jr.
*Assistant Examiner*—John W. Cabeca
*Attorney, Agent, or Firm*—Gifford, Groh, Sprinkle, Patmore and Anderson

[57] ABSTRACT

A starting control circuit is provided for use with a mechanical duty single phase alternating current motor having a start winding and a main or run winding. Both the main and start windings are electrically connected to the alternating current source during the initial starting of the motor. Transducers detect the current phase of both the start and main winding and comparators then compare these current phases together. A comparator generates a pulsed output signal when the phase of the start winding lags the phase of the main winding and this pulsed output signal has a pulse width proportional to the magnitude of the phase lag between the start and main windings. These pulsed output signals are integrated and a electronic switch is activated to disconnect the start winding from the power source whenever the integrated pulsed output signals exceed a predetermined value.

8 Claims, 2 Drawing Sheets

STARTING CONTROL CIRCUIT

BACKGROUND OF THE INVENTION

1. Field of the Invention

The present invention relates to a starting control circuit for a mechanical duty single phase alternating current motor having a start winding and a main winding.

2. Description of the Prior Art

Single phase mechanical duty alternating current electrical motors typically have both a start winding and a main winding. The start winding is activated or energized from the alternating current source in order to provide sufficient starting torque to start the motor. The start winding is then subsequently disconnected from the power source after the motor speed obtains a predetermined value and, thereafter, the main winding powers the motor.

There have been a number of previously known ways to disconnect the start winding from the power source after the motor attains a predetermined speed. However, the most common method for electrically disconnecting the start winding from the power source is to use a mechanical switch having a switch element subjected to centrifugal forces caused by the rotation of the electric motor. Once the motor obtains the predetermined speed, the centrifugal switch element opens the mechanical switch thereby disconnecting the start winding from the power source.

One disadvantage of these previously known mechanical switches is that the mechanical switches are prone to failure after extended use. Such failure can be caused not only by mechanical wear of the switch elements, but also by dirt, debris and other contaminants which accumulate on the switch elements.

There have, however, been a number of previously known electronic switches for electronically disconnecting the start winding from the power source after the motor attains a predetermined rotational speed. These previously known electronic switches have used a number of different methods for detecting the speed of the motor.

In one previously known method, one or more Hall effect transducers are positioned around the motor housing and a magnetic element is attached to the motor shaft. Circuitry connected to the Hall effect transducers then determines the rotational speed of the motor shaft and this circuitry, in turn, controls the activation of an electronic switch connected in series between the start winding and the power source. These previously known devices, however, have not enjoyed widespread usage or success for a number of reasons. Once such reason is that the Hall effect transducers and activating magnets are relatively expensive and thus increase the overall cost of the motor. Furthermore, these previously known start control circuits require a complete retrofit of the motor and thus cannot be easily used for repairing existing motors.

A still further type of electronic control circuit, such as disclosed in U.S. Pat. No. 4,496,895 to Kawate et al., utilizes an electronic circuit which compares the current phase of the start and main windings. It is well known that the current phase of the start winding leads the main winding during low speed revolution of the electric motor, but lags the phase of the main winding at higher rotational speeds of the motor. The Kawate et al. patent then uses this phase relationship between the start and main windings to activate a pulse transformer which, through other circuitry, electronically disconnects the start winding from the motor circuit when the phase of the start winding first begins to lag the phase of the main winding.

These previously known start control circuits which utilize the phase relationship of the start and main windings, however, have not enjoyed wide-spread acceptance or usage. One disadvantage of these previously known devices is that the pulse transformers are very expensive to obtain and thus economically infeasible. A still further disadvantage of these previously known start control circuits is that the start winding is disconnected from the motor circuit immediately when its phase lags the phase of the main winding.

The operation of the Kawate circuit is best understood with reference to FIG. 1 in which the motor torque is plotted on the Y axis as a function of percent of motor speed which is plotted on the X axis for a typical motor. Line 100 represents the motor torque when both the main and start windings are energized while line 102 represents the motor torque when only the main winding is energized.

From FIG. 1, it can be seen that, for ideal maximum motor torque operation and thus maximum motor acceleration, the start winding should be switched off at point 104, i.e. where the torque lines 100 and 102 cross each other. For the motor depicted in FIG. 1, this occurs at about 48% of the motor speed.

In virtually all cases for conventional motors, the phase of the start and main windings cross each other at a slower motor speed than point 104 in FIG. 1, i.e. where the torque lines 100 and 102 cross each other. For the motor depicted in FIG. 1, which is a split phase motor with a ten ohm start winding, the phase of the main and start windings cross each other at point 106 which is about 33% of the motor speed. Thus, using the Kawate circuit immediately switches off the start winding which results in an immediate decrease in motor torque to the point 108 shown in FIG. 1. This results in slower motor acceleration than if the motor start winding was disconnected at the ideal time, i.e. point 104 in FIG. 1.

SUMMARY OF THE PRESENT INVENTION

The present invention provides a starting control circuit for a mechanical duty single phase alternating current motor having a start and main winding which overcomes all of the above-mentioned disadvantages of the previously known devices.

In brief, the present invention includes a first transducer having a primary and secondary coil. The primary coil is connected in series with both the start winding as well as an electronic switch, such as a triac. The secondary winding of the first transducer is electrically connected to one input of a comparator.

Similarly, a second transducer includes a primary winding in series with the main motor winding and a secondary coil which is electrically connected to an input of a second comparator. The second input of each comparator is then connected to the same voltage level so that each comparator provides a pulse output signal in relative phase with the current phase of its respective start or main winding.

The output from the first comparator is shifted in phase approximately 90° by a resistor capacitor network and the shifted signal is electrically connected as an input signal to the positive input of a third comparator. Similarly, the output from the second comparator is connected as an input signal to the negative input of the third comparator. The output signal from the first comparator is also logically ANDed with the output from the third comparator. Consequently, the third comparator generates a pulse output signal on its output only when the current phase of the start winding lags the current phase of the main winding. Furthermore, the width of this pulse output signal is proportional to the magnitude of the phase difference or phase lag between the start winding and the main winding.

The output pulses from the third comparator are then integrated by a capacitor and resistor parallel combination. This capacitor and resistor combination is also electrically connected to an input of a fourth comparator which switches when the voltage at the capacitor-resistor parallel combination exceeds a predetermined value. When this occurs, the fourth comparator switches the triac to an open or off position and thus electronically disconnects the start winding from the motor circuit.

A primary advantage of the present invention is that most of the circuitry, except for the transducers, capacitors and triac, can be manufactured in a single integrated circuit. As such, the starting control circuit of the present invention can be inexpensively manufactured.

A still further advantage of the present invention is that the starting control circuit of the present invention can be used to upgrade or repair existing electric motors without expensive retrofitting or redesign of the motor.

A yet further advantage of the present invention is that, unlike the Kawate, the starting control circuit maintains energization of the start winding for a period of time after the phase of the start winding lags the main winding. This enables the present invention to maintain the energization of the start winding to the ideal switch off point 104 (FIG. 1) to ensure maximum torque and maximum motor acceleration.

BRIEF DESCRIPTION OF THE DRAWING

A better understanding of the present invention will be had upon reference to the following detailed description, when read in conjunction with the accompanying drawing in which.

DETAILED DESCRIPTION OF A PREFERRED EMBODIMENT OF THE PRESENT INVENTION

Figure 2:
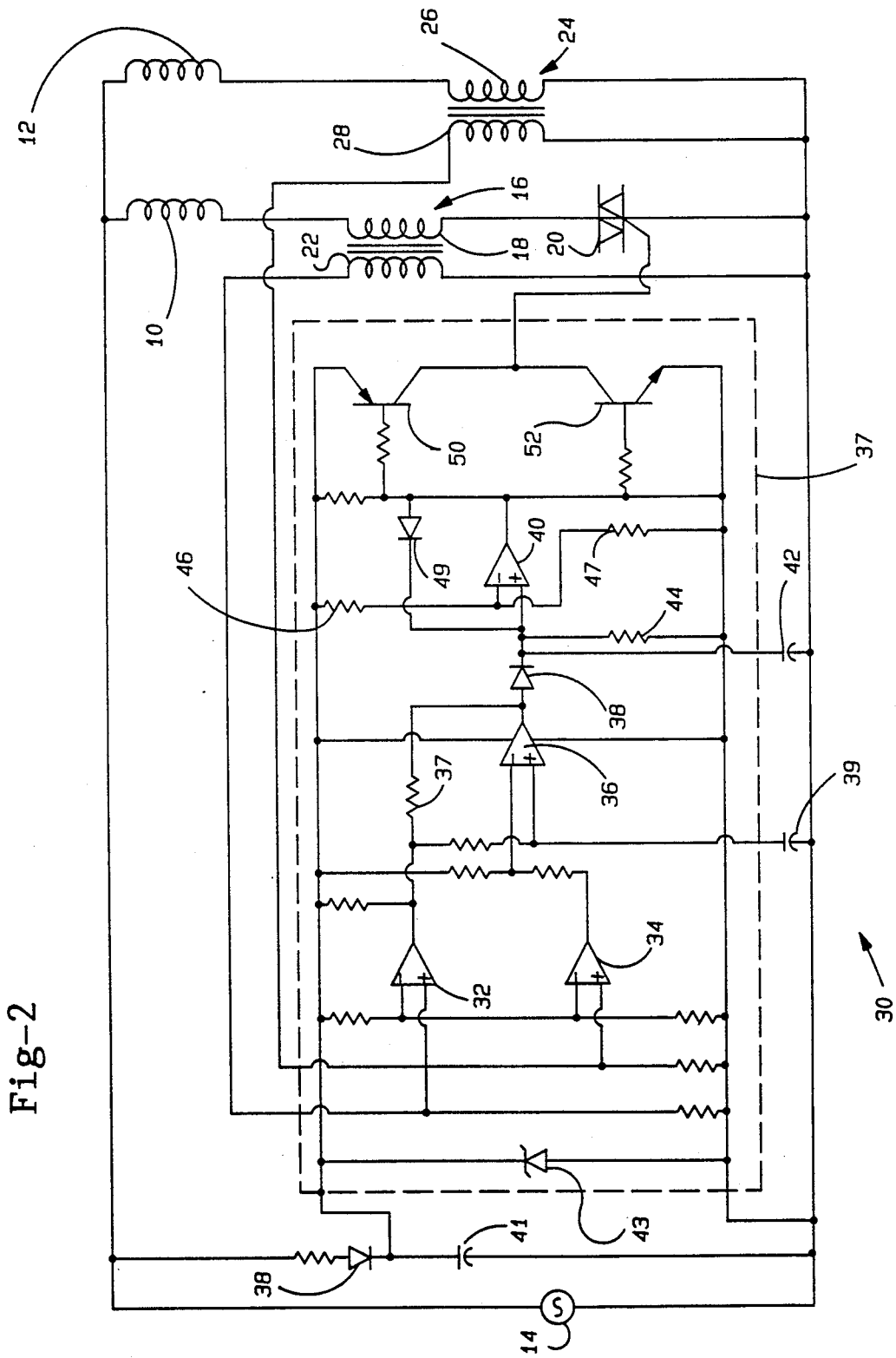
FIG. 2 is a schematic diagram of a preferred embodiment of the present invention.

With reference to FIG. 2, portions of an alternating current electric motor are there shown including both a start winding 10 and a main or run winding 12. In a fashion which will be subsequently described in greater detail, the start and main windings 10 and 12 are adapted for connection with a source 14 of alternating current.

A first transducer 16 has its primary coil 18 electrically connected in series with the start winding 10 and an electronic switch 20, such as a triac, and the alternating current source 14. The transducer 16 also includes a secondary coil 22 so that the output of the secondary coil 22 is in relative phase with the current flow through the primary coil 18.

A second transducer 24 is also provided having a primary coil 26 electrically connected in series with the main winding 12 of the electric motor and the alternating current source 14. A secondary coil 28 of the transducer 24 thus produces an output which is in relative phase with the current phase through the main motor winding 12.

A starting control circuit 30 is provided for selectively controlling the activation of the electronic switch 20, and thus the activation and deactivation of the start winding 10 of the motor. This starting control circuit 30 includes a first comparator 32 and a second comparator 34. The positive input of the first comparator 32 is electrically connected to the secondary winding 22 of the transducer 16 while, similarly, the secondary winding 28 of the second transducer 24 is connected to the positive input of the second comparator 34. The negative inputs of the comparators 32 and 34 are electrically connected to a common reference voltage.

During the initial operation of the motor and assuming that both the start winding 10 and main winding 12 are energized, the comparators 32 and 34 provide a pulse signal at their respective outputs which are in relative phase with the current phase through the respective start and main windings 10 and 12. Thus, during the initial energization of the motor windings 10 and 12, the current in the start winding 10 leads in phase the current in the main winding 12. Consequently, the output from comparator 32, shown by graph 80 in FIG. 3, leads the output from comparator 34, shown by graph 82 in FIG. 3.

Preferably the comparators 32 and 34, together with other components which will be subsequently described, are contained in a single integrated circuit illustrated at 37. Power is supplied to the circuit 37 through a diode 38 and capacitor 41 series combination connected in series with the power source 14. A zener diode 42 in the integrated circuit package 37 maintains a constant voltage for the circuitry within the integrated circuit 36.

The outputs from the comparators 32 and 34 are respectively connected to the positive and negative inputs of a third comparator 36. Additionally, a capacitor 39 is connected between the positive input of the comparator 36 and ground together with resistor R which causes a phase shift approaching 90° of the output signal as the positive input to the comparator 36 as depicted in graph 84 in FIG. 3. A pull up resistor 37 also logically ANDs the output of the comparator 32 and the output of the comparator 36.

The net effect of the phase shift created by the resistor capacitor network 39, the pull up resistor 37 and comparator 38 is that the third comparator 36 will only provide an output signal when the phase of the current in the start winding 10 lags the phase of the current in the main winding 12. When this occurs, the third comparator 36 will generate a pulse signal on its output. Furthermore, the width of the pulse from the third comparator 36 will be proportional to the amount of the phase lag of the start winding 10 with respect to the main winding 12.

Figure 3:
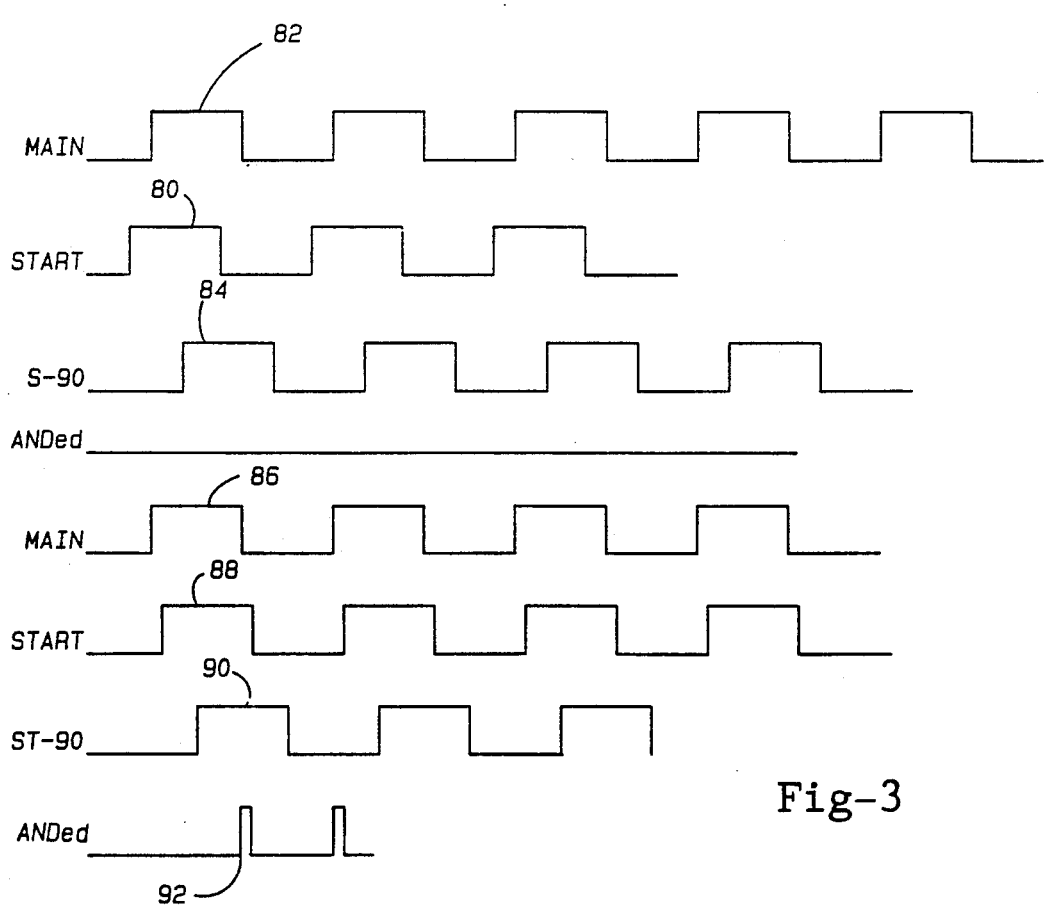
FIG. 3 is a pulse diagram depicting the operation of the invention.

The situation where the third comparator 36 begins to generate output pulses is depicted in FIG. 3 where graph 86 represents the phase of the main winding, graph 88 represents the phase of the start winding as slightly lagging the main winding and graph 90 represents the phase of the start winding shifted 90°. At this time pulses shown in graph 92 represent the output from the third comparator 36. These pulses have a width equal to the magnitude that the start winding phase lags the main winding.

The output pulses from the third comparator 36 are fed through a diode 38 to the positive input of a fourth comparator 40. Additionally, a capacitor 42 and resistor 44 are connected in parallel with each other while one end of the parallel resistor 44 and capacitor 42 combination is connected to the output from the diode 38. The other end of the resistor 44 and capacitor 42 parallel combination is connected to ground.

The resistor 44 and capacitor 42 parallel combination thus serves as an integrating circuit which integrates the output pulses from the third comparator 36 via the diode 38. With relatively short pulses from the comparator 36, the capacitor 42 charges slightly with each pulse while the resistor 44 discharges in the interval between adjacent pulses. As the comparator 36 output pulses become wider, the charge on the capacitor 42 increases proportionately.

When the voltage level at the resistor 44 and capacitor 42 reaches a predetermined level, as determined by biasing resistors 46 and 47 connected to the negative input of the comparator 40, the comparator 40 switches its output signal from low to high. Once the comparator switches from low to high, a feedback diode 49 locks the comparator 40 in its switched or high state.

The output from the fourth comparator 40 is connected to the base of two switching transistors 50 and 52. The transistor 50 is a PNP transistor while the transistor 52 is an NPN transistor. The collectors of the transistors 50 and 52 are connected together and are also connected to the gate of the triac 20.

Thus, when the output from the fourth comparator 40 is low, the transistor 50 is turned on and the transistor 52 is turned off. In this condition the transistor 50 provides current to the base of the triac 20 thus turning the triac 20 on and electrically connecting the start winding 10 with the power source 14. Conversely, when the fourth comparator 40 switches from low to high, the transistor 50 turns off and the transistor 52 turns on. When this occurs, the transistor 52 electrically connects the gate of the triac 20 to ground thus shutting off the triac 20 and electrically disconnecting the start winding 10 from the power source 14.

The start control circuit 30 of the present invention also includes various biasing and feedback resistors for the comparators and transistors. Such resistors, however, are well known to those having ordinary skill in the art so that a further description thereof is unnecessary.

In operation, during the initial energization of the motor, both the start winding 10 and main winding 12 are electrically connected to the power source 14. During this condition, the transistor 50 is turned on which provides current to the gate of the triac 20 thereby completing the electrical circuit for the start winding 10.

Furthermore, during the initial starting of the motor, the current phase of the start winding 10 leads the current phase of the main winding 12. Consequently, the output from the third comparator 36 remains low which, likewise, maintains the output from the fourth comparator 40 low and retains the triac 20 in its closed or on state by supplying current to the gate of the triac 20 via the transistor 50.

As the speed of the motor increases, the current phase of the start winding will begin to lag the current phase in the main winding 12 at a predetermined rotational speed. When this occurs, the third comparator 36 produces a pulse output signal in which the width of each pulse is proportional to the magnitude of the phase lag between the start winding 10 and main winding 12. These output pulses are integrated by the capacitor 42 and resistor 44 parallel combination in the previously described fashion. As the speed of the motor further increases, the width of the pulses from the third comparator 36 increases thereby increasing the charging of the capacitor 42 and simultaneously increasing the voltage level at the positive input for the fourth comparator 40.

When the positive input of the fourth comparator 40 reaches a predetermined amount and determined by the voltage biasing on its negative input, the fourth comparator 40 switches from low to high. When this occurs, the fourth comparator 40 turns off the transistor 50 and turns on the transistor 52. Simultaneously, the gate of the triac 20 is connected to ground thereby opening the triac 20 and electrically disconnecting the start winding 10 from the power source 14.

From the foregoing, it can be seen that the present invention provides several advantages over the previously known devices. One such advantage is that the present invention utilizes only electronic components thereby eliminating mechanical failure common to the previously known mechanical switches.

A still further advantage of the present invention is that a majority of the components of the starting circuit can be manufactured in a single integrated circuit package. This not only reduces the overall manufacturing and assembly costs for the starting circuit, but also increases the reliability of the overall starting circuit.

Figure 1:
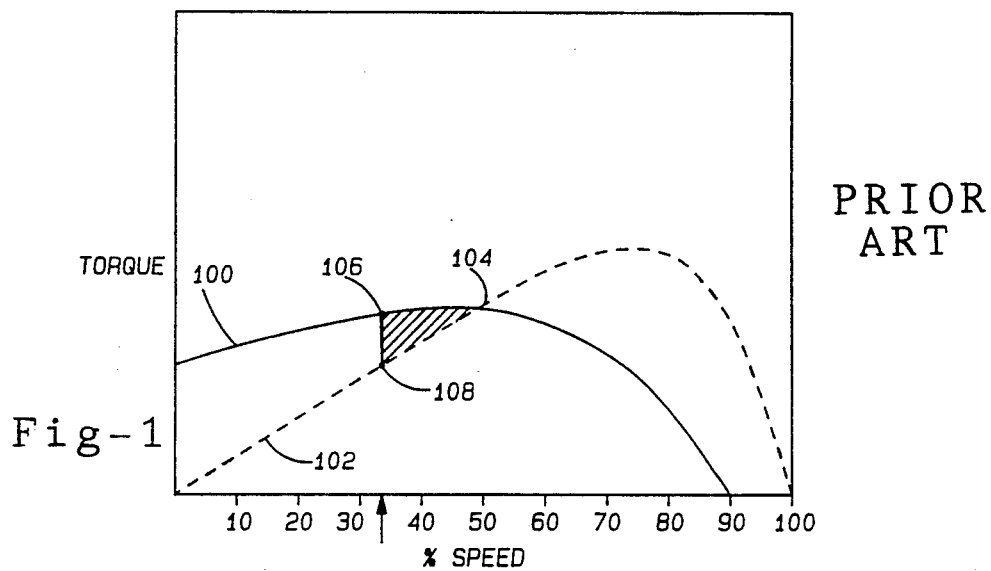
FIG. 1 is a torque versus percent of motor speed graph of a typical single phase split phase motor.

A still further advantage of the present invention is that the starting control circuit 30 of the present invention continues to energize the start winding 10 for a period of time even after the current phase of the start winding 10 begins to lag the current phase of the main winding 12. This, unlike the Kawate patent, enables disconnection of the start winding at the ideal point 104 (FIG. 1) to maximize motor torque and acceleration during start up.

Having described my invention, however, many modifications thereto will become apparent to those skilled in the art to which it pertains without deviation from the spirit of the invention as defined by the scope of the appended claims.

I claim:

1. For use in conjunction with a mechanical duty single phase alternating current electric motor having a start winding and a main winding, both windings adapted for connection with a source of alternating current, a starting control circuit for controlling enerization of the starting winding comprising:

means for electrically connecting the start winding and main winding to the source of power during initial enerization of the motor, means for detecting the current phase of the start winding, means for detecting the current phase of the main winding, means for comparing the current phase of the start and main windings and for generating a pulsed output signal when the phase of said start winding lags the phase of said main winding, said pulsed output signal having a pulse width proportional to the magnitude of the phase lag, means for integrating said pulsed output signal, means for electrically disconnecting said starting winding from the source of power whenever the integrated pulsed output signal exceeds a predetermined value.

2. The starting control circuit according to claim 1, wherein said current phase detecting means for said start winding comprises a transducer having a primary coil connected in series with the start winding and a secondary winding connected to an input of a first comparator.

3. The starting control circuit according to claim 2, wherein said current phase detecting means for said main winding comprises a transducer having a primary coil connected in series with the main winding and a secondary winding connected to an input of a second comparator.

4. The starting control circuit according to claim 1, wherein said comparing means comprises a comparator having two inputs, said comparator inputs being connected to outputs from said detecting means.

5. The starting control circuit according to claim 4, wherein said integrating means comprises a capacitor electrically connected to an output from said comparator.

6. The starting control circuit according to claim 5, wherein said integrating means further comprises a resistor connector in parallel with said capacitor.

7. The starting control circuit according to claim 1, wherein said disconnecting means comprises an electronic switch connected in series with said start winding.

8. The starting control circuit according to claim 7, wherein said electronic switch comprises a triac.

* * * * *